Patented May 6, 1930

1,757,826

UNITED STATES PATENT OFFICE

WILLIAM J. BANNISTER, OF TERRE HAUTE, INDIANA, ASSIGNOR TO COMMERCIAL SOLVENTS CORPORATION, OF TERRE HAUTE, INDIANA, A CORPORATION OF MARYLAND

PURIFICATION OF GASEOUS MIXTURES

No Drawing. Application filed January 25, 1926. Serial No. 83,769.

My invention relates to the removal of sulfur and sulfur compound from gases composed mainly of oxides of carbon. More particularly, my invention relates to the purification of gaseous mixtures containing carbon monoxide, carbon dioxide, and inert gases, the purification being accomplished by passing the gaseous mixture over iron oxide at an elevated temperature.

It is well known that when coal gas, producer gas, or other sulfur-containing gases, usually derived from coal, are passed over iron oxide maintained at a suitable temperature and in the presence of water vapor, a reaction occurs in which all of the sulfur compounds otherwise constituted are converted to hydrogen sulfide. For example carbon disulfide and water react in the presence of iron oxide to form hydrogen sulfide as follows:—

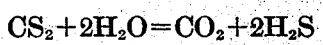

When this reaction occurs some of the hydrogen sulfide reacts with the iron oxide to form iron sulfide and is thus removed from the gas, but at ordinary temperatures the reaction is not complete and the activity of the iron oxide is soon destroyed.

It has also been stated (English Patent 130,654—1919) and has been generally believed that if such gases are passed over iron oxide at temperatures above 500°, all of the organic sulfur compounds such as carbon disulfide and carbon oxysulfide are converted to hydrogen sulfide, but under these conditions the hydrogen sulfide is not absorbed by the iron oxide and must be scrubbed out of the gas by a separate chemical process.

This art has been highly developed and many desulfurization processes have been reported. The removal of sulfur compounds from gases such as water gas, etc., is doubly important when the gases, or their components are to the employed in chemical reactions. In the production of methanol and other aliphatic alcohols, acids, aldehydes, and ketones by the high pressure catalytic reaction of carbon dioxide or carbon monoxide with hydrogen, the oxides of carbon are often obtained from coal through the water gas reaction and all traces of sulfur must be removed if the catalytic reaction is to take place.

My invention relates particularly to the removal of sulfur from gaseous oxides of carbon either in pure form or admixed with small amounts of nitrogen or other inert gases, these gases being useful in the so-called "methanol synthesis" and for allied purposes.

I have discovered that when a gaseous mixture comprising oxides of carbon, which may or may not be mixed with nitrogen or other inert gases, is passed over iron oxide maintained at an elevated temperature, the sulfur originally contained in the gas is removed in substantial entirety. Any oxide of iron which can be obtained in fragments of small size and large surface is suitable for employment in my process—in fact ordinary natural hydrated oxide of iron ($Fe_2O_3$) containing about 35% of iron, this being the material that has been employed in gas plants for years for the cold moist process of sulfur removal, is quite suitable.

A wide range of operating temperature is possible with my process. The upper temperature limit is governed only by the economy of operation and may run almost as high as the decomposition point of the iron oxide. On the other hand, desulfurization ceases to be complete when the temperature drops below 400° C. though the process operates at lower temperatures. I have found that satisfactory operation is possible within the range of 400–850° C. and I prefer to employ such temperatures. The precise temperature to employ is governed only by the source of the gaseous mixtures treated— i. e.,—if these mixtures are produced at high temperatures, the desulfurization according to my process may be conducted without cooling the gases. On the other hand if cold gases are to be treated, the process may be carried on quite satisfactorily at a relatively low temperature.

The primary function of the iron oxide is apparently not as a catalytic agent but rather as a reactant or absorbent for the sulfur. However it should be noted that the first action of the iron oxide is probably a partial reduction to iron which acts on carbon disulfide and carbon oxysulfide catalytically, inducing the formation of free sulfur, or in case traces of hydrogen are present, of hydrogen sulfide. Either of these compounds apparently will react with the iron oxide, as no sulfur remains in the exit gas. The exact manner in which iron oxide combines with the various sulfur compounds in the gaseous mixtures has, however, not been determined and forms no part of this invention.

By laboratory experiment I have determined that iron oxide when employed in this process retains its ability to remove all sulfur from such gaseous mixtures until 80% of the iron is converted to iron sulfide, whereafter the efficiency of the removal drops off somewhat owing to the exhaustion of available iron oxide.

Iron oxide cannot be very satisfactorily employed by itself in my process for the reason that the reactions which it undergoes cause an expansion in volume with a consequent clogging of the tube after the process has been in operation for some time. Consequently it is desirable to mix the iron oxide with an inert supporting material such as broken pottery, clay balls, or the like and when this is done no clogging occurs.

Alternatively one may mix fragments of iron oxide with steel wool as a supporting surface instead of an inert material. As disclosed in my companion application Serial No. 83,768, filed January 25th, 1926, steel wool itself has a desulfurizing action on such gas mixture and consequently the desulfurizing action obtained by the mixture is due in part to each component.

The following data obtained with my process is typical of its operation but is not regarded as limiting. The mixture of carbon monoxide and carbon dioxide employed was prepared in the well known manner by passing carbon dioxide over heated coke. Other gases such as nitrogen were introduced into the carbon dioxide prior to conversion. The gas mixture thus prepared was divided into two streams, one of which led directly to an analytical device where the contained sulfur was determined. The other stream of gas passed into a tube containing the iron oxide maintained at the temperatures indicated and at a rate of flow of about 3.4 liters per minute. This tube was 5/8 inches in internal diameter and 5 inches long.

| Gas mixture No. | Liters treated | Temperature C.° | Form of support for iron oxide | Grains sulfur per 100 cubic feet in untreated gas | Grains sulfur per 100 cubic feet in the treated gas |
|---|---|---|---|---|---|
| 1 | 123 | 565 | Steel wool | 70.3 | 2.50 |
| 2 | 44 | 570 | Steel wool | 51.9 | 3.1 |
| 3 | 110 | 700 | Porcelain | 69 | 2.10 |

*Gas mixtures—Composition—By volume*

No. 1—Carbon monoxide 90%, carbon dioxide 10%;
No. 2—Carbon monoxide 15%, carbon dioxide 80%, nitrogen 5%;
No. 3—Carbon monoxide 95%, carbon dioxide 5%.

My process will operate at pressures above atmospheric, and as a unit process in a chain of operations it may be desirable to so operate it at pressures between 10 and 200 atmospheres. However the reactions involved are not particularly affected by pressure changes.

Now having described my invention I claim:—

1. The process of treating a gaseous mixture containing principally an oxide of carbon comprising passing the gaseous mixture over iron oxide at a temperature between 400 and 850° C. to remove the sulphur content of the gas in substantial entirety.

2. The process of treating a gaseous mixture containing principally an oxide of carbon comprising passing the gaseous mixture over iron oxide at a temperature between 400 and 850° C. and at an elevated pressure to remove the sulphur content of the gas in substantial entirety.

3. The process of treating a gaseous mixture containing principally an oxide of carbon comprising passing the gaseous mixture over iron oxide at a temperature between 400 and 850° C. and at a pressure ranging from approximately 10 to 200 atmospheres to remove the sulphur content of the gas in substantial entirety.

In testimony whereof I affix my signature.

WILLIAM J. BANNISTER.